United States Patent [19]

Justus et al.

[11] Patent Number: 6,140,651

[45] Date of Patent: *Oct. 31, 2000

[54] OPTICALLY STIMULATED, FAST NEUTRON SENSOR AND DOSIMETER AND FIBER-OPTIC COUPLED FAST NEUTRON REMOTE SENSOR AND DOSIMETER

[75] Inventors: Brian L. Justus; Alan L. Huston, both of Springfield, Va.; Alan L. Justus, Bolingbrook, Ill.

[73] Assignee: The United States of America as represented by the Secretary of the Navy, Washington, D.C.

[*] Notice: This patent is subject to a terminal disclaimer.

[21] Appl. No.: 09/025,028

[22] Filed: Feb. 18, 1998

[51] Int. Cl.[7] .................................................. G01T 3/06
[52] U.S. Cl. ............................... 250/390.11; 250/390.03; 250/484.4; 250/484.5
[58] Field of Search ..................... 250/390.11, 390.01, 250/390.03, 391, 370.05, 337, 484.3, 484.4, 484.5

[56] References Cited

U.S. PATENT DOCUMENTS

| | | |
|---|---|---|
| 3,255,350 | 6/1966 | Fix . |
| 3,399,301 | 8/1968 | Schayes et al. . |
| 3,761,710 | 9/1973 | Yamashita et al. . |
| 3,896,306 | 7/1975 | Becker et al. . |
| 4,016,422 | 4/1977 | Moran et al. . |
| 4,039,834 | 8/1977 | Lucas et al. . |
| 5,321,269 | 6/1994 | Kitaguchi et al. .................... 250/370.5 |
| 5,572,027 | 11/1996 | Tawil et al. . |
| 5,585,640 | 12/1996 | Huston et al. ........................ 250/483.1 |
| 5,606,163 | 2/1997 | Huston et al. .......................... 250/337 |

*Primary Examiner*—Constantine Hannaher
*Assistant Examiner*—Albert Gagliardi
*Attorney, Agent, or Firm*—Barry A. Edelberg; John J. Karasek

[57] ABSTRACT

An apparatus and method for the measurement of fast neutrons is described. The apparatus comprises a proton radiator with a doped glass, such as a Nd-doped glass containing ZnS:Cu. The dosimeter may be read by either laser heating or infrared stimulation of the glass or by direct scintillation. The fast neutron dose in a mixed field of gamma rays and fast neutrons can be measured by comparison of a dosimeter without a proton radiator and a dosimeter with a proton radiator.

41 Claims, 2 Drawing Sheets

OPTICALLY STIMULATED, FAST NEUTRON SENSOR AND DOSIMETER AND FIBER-OPTIC COUPLED FAST NEUTRON REMOTE SENSOR AND DOSIMETER

CROSS REFERENCE TO RELATED APPLICATIONS

This application is related to commonly assigned and copending U.S. patent application Ser. Nos. 08/371,305 and 08/371,306 both filed Jan. 11, 1995 and now respectively issued as U.S. Pat. Nos. 5,606,163 and 5,585,640 and U.S. patent application Ser. No. 08/598,677 filed Feb. 8, 1996 and now issued as U.S. Pat. No. 5,656,815, and U.S. patent application Ser. No. 08/848,259 filed Apr. 29, 1997 and now issued as U.S. Pat. No. 5,811,822, all of which are herein incorporated by reference in their entireties, for all purposes.

BACKGROUND OF THE INVENTION

1. Field of the Invention

The present invention relates to fast neutron sensing and dosimetry using a proton radiator coated on a transparent glass phosphor that exhibits one or more of the properties of thermoluminescence, optically stimulated luminescence and scintillation. More particularly, the invention relates to the use of a neutron detector in a remote sensing unit for fast neutrons and a fast neutron personal dosimeter. The radiation dose to the detector is determined by monitoring one or more of the following phosphor characteristics: laser heated thermoluminescence, optically stimulated luminescence and scintillation.

2. Description of the Background Art

Fast neutron dosimetry is important in both military and civilian nuclear applications. Fast neutron dosimetry is required for the protection of personnel employed at civilian nuclear power generating plants as well as civilian nuclear reprocessing and enrichment plants. Fast neutron dosimetry is also required for the protection of Department of Defense personnel involved with the operation of nuclear propulsion systems and the handling of nuclear weapons. The U.S. Navy has been actively searching for a simple and effective technique that provides an accurate measure of the absorbed radiation dose of fast neutrons. The Navy's radiation protection needs for x-rays and thermal neutrons have been satisfied for the past quarter century using solid state thermoluminescence dosimetry (TLD). Thermoluminescence dosimetry is a well established technology used extensively for environmental and personnel monitoring of radiation exposure. At the present time, it is the method of choice for all dosimetry applications in the U.S. Navy, supplanting the use of conventional film badges.

The thermoluminescent dosimetric materials in current use include a variety of doped crystalline phosphors that form long-lived electron and hole traps upon exposure to radiation. The release of the trapped electrons and/or holes upon heating with the simultaneous release of a photon is known as thermoluminescence. Traditional thermoluminescent dosimeters use a doped crystalline phosphor in the form of powders or extruded chips which are typically opaque and highly light scattering. Examples of these materials would include polycrystalline powders of lithium fluoride or calcium fluoride each doped with activators, such as titanium, magnesium and phosphorus, and powders of calcium fluoride doped with manganese. The phosphor grains are micron sized and are highly light scattering, thus reducing the brightness of the phosphor emission and placing practical limitations on the thickness of the phosphor.

A common technique used to monitor human exposure to fast neutrons is the use of nuclear track detectors. These detectors operate by detecting the tracks of recoil protons produced by the elastic scattering of fast neutrons in a hydrogen-rich material. Solid state track detectors, such as the plastic CR-39, are hydrogen-rich but require complex processing, including chemical etching to detect the neutron dose. Such detectors may also be coated with polyethylene as a proton radiator, which has a greater mole fraction of hydrogen than the track detector to improve the track detector's sensitivity. A problem with these track detectors is the uncertainty in discriminating tracks due to protons from imperfections or abrasions in the plastic.

Electronic silicon diode dosimeters with polyethylene proton radiators have also been used for neutron dosimetry. The silicon diode dosimeters are subject to several problems including the lack of long term stability, thus requiring recalibration before every use. In addition, electronic dosimeters often work well only in steady neutron fields and do not work well in pulsed or erratic fields and generally do not yield accurate results with intermediate or low energy neutron fields. Moreover, they are active devices requiring an external power supply.

Silicon diode sensors have also been used as remote fast neutron sensors. The silicon diode sensors are limited to cable lengths of about twelve feet and cannot be placed tens or hundreds of meters from the control electronics. For long distance applications, silicon diode sensors are manufactured with radio transmitting capabilities which significantly increase the complexity and cost of the sensor.

Bubble dosimeters have also been used for fast neutron dosimetry. These devices are interesting because of their complete insensitivity to gamma radiation, however, they are also expensive, lack dynamic range and a have limited useful lifetime.

Until the present invention, thermoluminescent detectors have not been suitable for fast neutron dosimetry, however, thermoluminescent detector phosphors doped with $^6$Li or B are used for thermal neutron dosimetry. The problem with using conventional thermoluminescent phosphors, including laser heated ones, is that the phosphor must be heated to high temperatures to release the trapped charges and measure the radiation dose. These high temperatures destroy the polyethylene proton radiator rendering it unsuitable for fast neutron dosimetry. Use of ultraviolet stimulated luminescence of thermoluminescent phosphors has also been reported. Powdered thermoluminescent phosphors were mixed with polyethylene and pressed into dosimeter disks. After exposure to high energy neutron radiation, the dosimeter disks were heated to a temperature below the melting point of the polyethylene and exposed to ultraviolet light to efficiently stimulate luminescence. Problems with this technique include scaling since only luminescence from the surface is detected. The dosimeter also cannot be reused because it cannot be reannealed at high temperatures to depopulate all the trapped charges.

Measurement of fast neutron radiation levels in hazardous areas such as nuclear waste sites, or inaccessible areas, such as sampling wells for in-situ ground water monitoring, requires the development of sensitive remote radiation measurement techniques. Remote sensing using fiber optics would be a preferable solution because of the small size of the fibers, their mechanical flexibility, and optical, rather than electrical, signal transmission. Several fiberoptic-based radiation sensing systems have been described that utilize radiation induced changes in the optical characteristics of the fiber, such as darkening of the glass, optical phase shifts due to heating, or change in the birefringence of a polarization maintaining fiber. Another approach utilizes a traditional thermoluminescent phosphor attached to the end of a multi-mode fiber optic cable. A laser is used to heat an adjacent absorber and the absorber then heats the thermoluminescent phosphor by thermal diffusion.

Each of the described fiber optic-based techniques has serious shortcomings that limit practical applications. The measurement of radiation induced darkening is straightforward but is limited in both sensitivity and dynamic range. In addition, photo-darkening is usually the result of photo-chemical damage and is irreversible. Phase shift measurement requires the use of an interferometer with phase sensitive detection and feedback controls, long fiber lengths, complex signal processing techniques and is extremely sensitive to changes in ambient temperatures. The fiber optic, laser heated thermoluminescent approach requires the use of a very thin layer of phosphor material because of inefficient heating of the phosphor by thermal diffusion and, additionally, problems associated with light scattering. The limitation on the thickness of the thermoluminescent phosphor material ultimately limits the sensitivity of this method.

The aforementioned problems in the prior art as well as others not specifically mentioned have been overcome by the present invention as described hereinafter.

SUMMARY AND OBJECTS OF THE INVENTION

It is an object of the present invention to provide an optically transparent, light stimulatable, fast neutron-sensitive, sensor element.

Another object of the invention is to provide an optically transparent, fast neutron sensitive, scintillating sensor element.

Another object of the invention is to form fast neutron sensors and dosimeters from the above sensor elements.

Another object of the invention to provide a fast neutron dosimeter for personnel using an optically transparent, light stimulated, fast neutron-sensitive sensor element as the detector.

Another object of the invention to make a fiber optic-coupled fast neutron remote sensor and dosimeter using an optically transparent, light stimulated, fast neutron-sensitive sensor element as the detector.

A further object of the invention is to make a fiberoptic coupled remote sensor and dosimeter using an optically transparent, fast neutron sensitive, scintillating sensor element as the detector.

These and other objects of the invention are accomplished as explained in more detail hereinafter.

BRIEF DESCRIPTION OF THE DRAWINGS

A more complete understanding of the invention will be readily obtained by reference to the following Description of the Preferred Embodiments and the accompanying drawings wherein.

DESCRIPTION OF THE PREFERRED EMBODIMENTS

Figure 1:
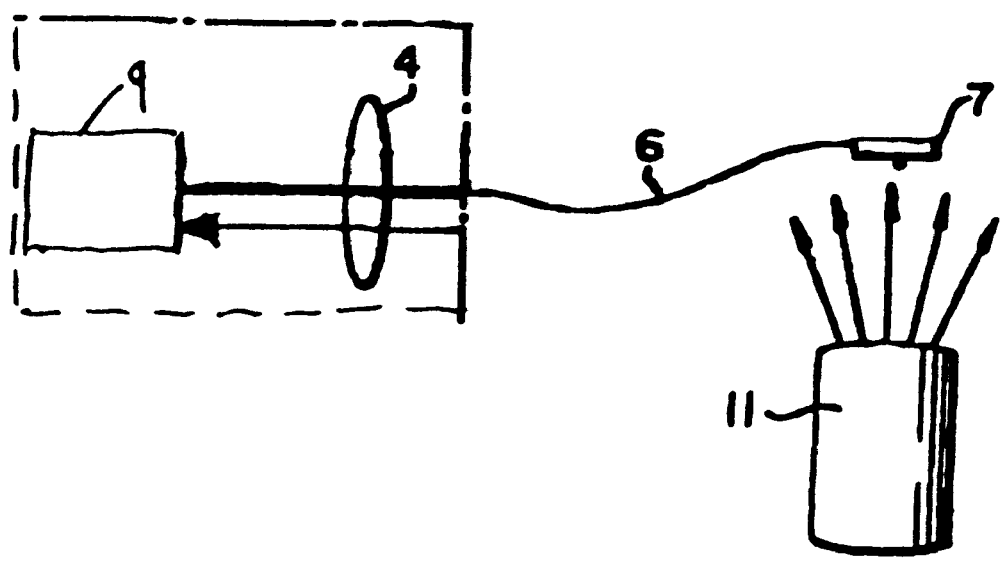
FIG. 1 schematically illustrates a first embodiment of the invention showing a fiber optic coupled, scintillating remote fast neutron sensing device.

The optically transparent, light stimulated, fast neutron-sensitive sensor element of the invention can be readily formed by coating an optically transparent, light stimulated, glass with a proton radiator. Light can be used to stimulate luminescence by a thermal mechanism, yielding thermoluminescence from the glass, or by an electronic mechanism yielding optically stimulated luminescence from the glass. Similarly, an optically transparent fast neutron sensitive sensor element of the invention can be readily formed by coating an optically transparent scintillating glass phosphor with a proton radiator. A proton radiator works by the fast neutron-proton elastic scattering process that occurs in the radiator whereby a fast neutron will elastically scatter a proton from the radiator into the glass.

The preferred radiator material is polyethylene because it has the greatest density of hydrogen per unit volume of any material. The preferred polyethylene is a high density polyethylene again because it has the greatest density of hydrogen per unit volume. Other suitable proton radiators include thermoplastic and thermoset polymers. The thermoplastic radiators include polyolefins, such as polypropylene and polyethylene/polypropylene blends, as preferred thermoplastic materials. Thermoset resins with a high percentage of hydrogen can also be used as a proton radiator. The light stimulated glasses and the scintillating glasses can be prepared by the methods disclosed in the aforementioned commonly assigned U.S. Pat. Nos. 5,606,163 and 5,585,640 and U.S. patent application Ser. No. 08/848,259.

In summary, light stimulated glass was prepared as follows: Porous Vycor glass (Type 7930) was purchased from Corning Glass and used as received. Copper ion and zinc sulfide (ZnS) dopants were deposited in the glass. An additional rare earth ion was also added to the glass composition. A number of rare earth metal ions can absorb light at the frequency of laser stimulation and therefore satisfy the requirements for laser heating. Those rare earth ions include europium (Eu), cerium (Ce), samarium (Sm), neodymium (Nd) and mixtures of these rare earths. In particular, neodymium is a preferred rare earth and a glass containing neodymium (Nd) ions in addition to the ZnS/Cu dopant was made. This glass phosphor exhibits a strong blue green prompt luminescence when exposed to ultraviolet light as well as a similar blue-green thermoluminescent emission following exposure to ultraviolet or gamma radiation. The usual size of a dosimeter made from this doped glass is about 0.020 inches thick, about 0.25 inches in diameter and weighs about 35 milligrams.

Infrared stimulatable glass dosimeters have also been developed. The luminescence of these dosimeters results from optical excitation by the infrared laser into the radiation induced absorption band in the glass rather than thermal excitation. A typical infrared stimulatable glass is prepared by diffusing a water solution of $Sr^{+2}$, $Eu^{+3}$ and $Sm^{+2}$ salts into Vycor porous glass rods. After drying the glass rods in air, the samples were then exposed to $H_2S$ gas for several hours followed by heat treatment of the glass to partially consolidate the pores, yielding a high optical quality doped silica glass.

A personal dosimeter for fast neutrons can be made by coating a hydrogen-rich proton radiator onto the laser heated glass dosimeter or infrared stimulatable glass dosimeter described previously. One embodiment of this fast neutron dosimeter utilizes a thin piece of ZnS/Cu/Nd-doped glass coated with a thin layer of polyethylene. A key feature of this fast neutron dosimeter is that the light stimulation of the phosphor does not significantly increase the bulk temperature of the phosphor so that the temperature of the polyethylene remains below its softening point. This is a critical advantage for thermoluminescent detection of fast neutrons using a thermoplastic proton radiator since all hydrogen-rich thermoplastic materials, such as polyethylene, melt at temperatures much lower than the temperature required to read a conventional thermoluminescent detector phosphor. Conventional thermoluminescent phosphors are usually annealed at about 80° C. to 120° C. and are heated to about 400° C. to 600° C. for readout. Polyethylene melts at about 115° C. and rapidly degrades and decomposes at higher temperatures. Therefore, it is impossible to use thermoplastic proton radiators with conventional thermoluminescent dosimeter phosphors. However, the laser stimulated thermoluminescent glass and infrared stimulatable glass of the present invention make it possible to use thermoplastic proton radiators because the integrity of the polyethylene proton radiator is maintained since the bulk temperature of the dosimeter glass usually increases only a few degrees upon readout.

Fast neutron dosimetry is made possible by the neutron-proton elastic scattering process that occurs in the proton radiator. The recoil protons produced in this process are used to detect the fast neutrons. For a given neutron energy, the proton energy can be less than or equal to the neutron energy, depending on the incident angle of the neutron and the angle the proton is scattered through. The energy spectrum and number of protons that leave the radiator and reach the detector (in this case the dosimeter glass), depend upon both the neutron energy and the thickness of the proton radiator. When the thickness of the radiator equals the range of the most energetic proton emitted from the radiator, then the condition of protonic equilibrium is established. Under these conditions the greatest number of protons are emitted and the detection has the greatest sensitivity. However, at protonic equilibrium, the sensitivity of the detector will also display the greatest variation over the range of interest, from 1 to 10 MeV, of the incident fast neutrons. It has been found that a flat response as a function of energy can be obtained by using thinner proton radiators that avoid the condition of protonic equilibrium. Since protonic equilibrium is satisfied from polyethylene film about 350 $\mu$m thick for 5 MeV incident neutrons, thicknesses less than about 150 $\mu$m for polyethylene are preferred. Even more preferred are thicknesses less than about 100 $\mu$m and still more preferred are polyethylene proton radiators from about 5 $\mu$m to about 50 $\mu$m thick, coated on a glass dosimeter having a thickness from about a few microns to several hundred microns.

A practical fast neutron dosimeter detector requires the ability to distinguish between fast neutrons and gamma radiation since most practical applications will be in a mixed radiation field of fast neutrons and gamma rays. Therefore, a simple and practical means for distinguishing the gamma radiation dose from the fast neutron dose is necessary.

This can be accomplished by taking into account the following design criteria for the fast neutron dosimeter and the surrounding environment. The detector mass, that is, the glass portion of the polyethylene proton radiator and the glass, should be kept to an absolute minimum, consistent with a good signal to noise ratio. The housing that holds the dosimeter should contain no metal parts and should be made only of a plastic, other than polyethylene. Preferably, the housing should be of a low hydrogen density plastic so that the proton radiator effect can be suppressed for the gamma detector. After these and other design criteria are satisfied, it is anticipated that superior performance will be realized using a differential detection method. This involves using the glass dosimeter without a proton radiator in close proximity to the fast neutron dosimeter as described in more detail in connection with FIG. 3. The glass can be a bare piece of glass or it can be coated with a material, hereinafter referred to a proton nonradiator, that mimics the preferred polyethylene proton radiator for gamma radiation, but contains no hydrogen so that the coating does not respond to fast neutrons. Comparing the signals from these two dosimeters will yield a measure of the fast neutron absorbed dose. An additional advantage is that the gamma ray dosimeter will also simultaneously yield a measure of the absorbed gamma ray dose which is needed for monitoring personnel exposed to the radiation field.

In another embodiment of a personal fast neutron dosimeter, a ground powder of the glass is mixed with a thermoplastic powder, preferably polyethylene powder, to achieve uniform dispersion and intimate contact between the proton radiator and the glass. A thin, uniform layer of polyethylene/glass can be fabricated by heating the powdered mixture of polyethylene and thermoluminescent glass, pressing the heated mixture between two plates to form a polyethylene/glass film, then allowing the film to cool. Films prepared in this manner have good optical properties resulting in efficient light stimulation and collection of luminescence and can be used in personal dosimeters by careful choice of materials and design of the dosimeter.

The advantages of the new personal dosimeter according to the invention include the feature that the dosimeter passively accumulates the absorbed radiation dose and does not, therefore, require an external power supply. In addition, the dosimeter accumulates the total radiation exposure, whether it occurs over a period of seconds or weeks. Another advantage is that the personal dosimeter can be reused because the laser illumination anneals all of the optically accessible traps and resets the dosimeter for another use.

The stimulation laser can be a low cost, solid state diode laser. Commercially available solid state diode lasers, such as GaAs diode lasers, can provide high power laser light over a wide range of wavelengths from about 770 nm to about 960 nm. Finally, since laser illumination of the phosphor does not significantly increase the bulk temperature of the glass, the dosimeter can be read in situ, for example, in a laminated badge. Reading a badge in this manner will be less labor intensive and more convenient since individual dosimeters do not need to be disassembled to be read.

The present invention makes possible a system of laminated badges wherein the badge has a magnetic strip or bar code identifying the individual worker wearing the badge. On entering the radiation exposure area, the worker inserts the badge into a card reader that reads the identifying information, reads and resets the dosimeter, tallies the accumulated radiation dose and stores the information regarding accumulated radiation in the worker's health and safety file. Upon leaving the radiation exposure area, the worker again places the badge in the card reader which again reads the identifying information, reads and resets the dosimeter and records the radiation dose in the worker's safety file.

The fiber optical coupled fast neutron dosimeter of the present invention is related to the optical, rapid readout, fiber-coupled thermoluminescence dosimeter described in U.S. Pat. No. 5,606,163 and in commonly assigned and copending U.S. patent application Ser. No. 09/025,033, filed on date even herewith. The laser heated thermoluminescent glass phosphor and the infrared stimulatable glass phosphor, the composition of which was previously described, were drawn into fibers and attached to multimode optical fibers.

Referring now to the drawings, FIG. 1 is a first embodiment of the fiberoptic coupled remote fast neutron sensing device of the invention. In the embodiment of FIG. 1, a light stimulation source is not required. The fast neutron sensing device comprises a scintillating glass phosphor coated with a proton radiator 7. Scintillating light is generated in the fast neutron sensing device 7 on exposure to a source 11 of fast neutrons. The scintillating light is directed through multimode fiber 6, collimated by a lens 4, and detected by a photomultiplier tube 9. The lens 4 may be omitted.

Figure 2:
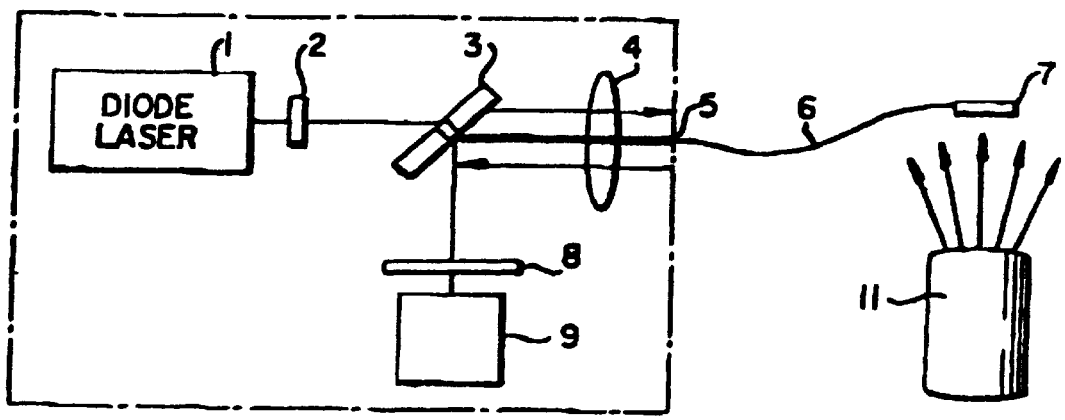
FIG. 2 schematically illustrates a second embodiment of the invention showing a fiber optic coupled optically stimulated remote dosimeter of the invention.

A schematic of the second embodiment of the fiber optic coupled fast neutron dosimeter of the invention is shown in FIG. 2. The 807 nm output of a 1 watt diode laser array 1 with a 200 nm emitting aperture, was collimated using a lens. The laser output was filtered with a Schott RG 780 color glass filter 2 to remove short wavelength light due to spontaneous emission. The laser light was directed through a dichroic mirror 3 selected to pass 807 nm light and reflect blue-green light and imaged onto the input 5 of a 50 meter long, multimode optical fiber 6 with a 200 μm diameter core using a second lens 4. The laser light was used to stimulate thermoluminescence from a ZnS:Cu, Nd glass fiber sensor that had been previously exposed to ionizing radiation. A fraction of the 500 nm laser stimulated thermoluminescent emission was trapped by total internal reflection, directed back through the multimode fiber 6, collimated by the lens 4 and reflected by the dichroic mirror 3 into a photomultiplier tube 9. A fiber optic splitter may be used in place of a dichroic mirror to separate the simulation light from the signal light. A HOYA CM500 color glass filter 8 was used to selectively block scattered diode laser light while passing the thermoluminescent signal. The photomultiplier tube was cooled and the signal was detected using photon counting and digitized. A photodiode or photoconductor may be used in place of a photomultiplier tube to detect the laser stimulated emission.

The fiber optic sensor was placed above a $^{60}$Co gamma ray source 11 and subjected to a 5 R/min exposure rate. Dose measurements were obtained by turning off the diode laser for a specified time interval, thereby allowing the fiber sensor to accumulate absorbed dose information, and then read out by turning the laser on at the end of the selected time interval. The laser heated thermoluminescent signal was completely read out in 10 to 15 seconds.

The fiber optic coupled dosimeter can be readily adapted for the measurement of fast neutrons by coating the glass dosimeter phosphor 7 with a proton radiator. The proton radiator is typically a thermoplastic, preferably polyethylene. As previously described, the thickness of the polyethylene layer can be adjusted to optimize detector response and sensitivity.

Figure 3:
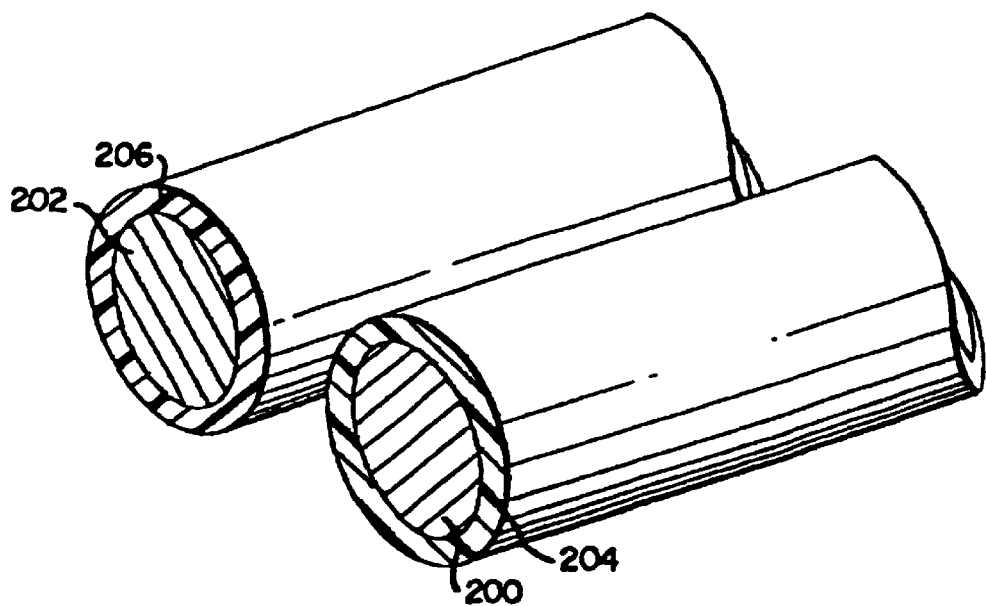
FIG. 3 depicts a cross-section of a fast neutron detector adjacent to a gamma ray sensitive detector.

As shown in FIG. 3, in order to provide for effective discrimination between fast neutrons and gamma rays, a second fiber sensor 200, not coated with a proton radiator, is placed in close proximity to the polyethylene coated dosimeter 202. To improve discrimination, the geometry and materials encasing the detection should be carefully chosen and a neutron insensitive coating 204 can coat the second fiber sensor 200. The neutron insensitive coating 204 should have a similar response to gamma radiation as the polyethylene coating proton radiator 206 of the fast neutron detector. The two fibers can be coupled to a readout unit as shown in FIG. 1 and placed as a fiber bundle in hazardous or difficult to access locations to measure the absorbed dose of fast neutrons. The difference between the signals from the two fibers represents a signal proportional to the fast neutrons detected.

It is apparent from the description of the fiber optic coupled dosimeter that a number of different doped glass phosphors, including thermoluminescent, scintillating and infrared stimulatable, can be used as the detector and the doped glass can be in any convenient or desired shape. In addition, by careful choice of shielding and discriminating between signals both gamma ray signal and fast neutron signal are readily obtained, allowing greater understanding of the radio nucleotides present in a borehole or waste dump.

The glass sensor may be flattened into a sheet form to increase the area available for neutron scattering events and enhance the sensitivity of the dosimeter. The sheet of the laser heated or infrared stimulatable phosphor glass is coated with a proton radiator, preferably polyethylene. The protons emitted by the proton radiator generate a population of filled traps that can be released upon stimulation with a laser source. The laser excitation can be accomplished using a fiber optic bundle containing several fibers to provide laser light to the detector as well as several fibers for transmitting the signal back to the readout unit. The collection of the luminescence is assisted by the waveguiding of the light to the edge of the sheet.

As is readily apparent from the foregoing description, the advantages of the all optical remote fast neutron sensor are many. The sensor and fiber optic cable are inexpensive and readily available. The fiber sensor is small and can easily be placed in areas that are difficult to access. Measurements are made using a laser and the fiber optic transmitted signal unlike electrical signals, are free from electromagnetic interference and cannot cause sparks in flammable environments. The multimode optical fiber can be up to a kilometer in length so that the detection unit can be located up to a kilometer away from the radiation hazard if necessary or desired. All measurements can be made in situ so that the fiber sensor need not be retrieved or handled to perform measurements. The sensor can be repeatedly used and is reset for each new measurement by the previous readout. Near real time measurements of absorbed dose can be performed while the sensor is experiencing radiation exposure. If real-time measurements are not required, the sensor can accumulate the absorbed dose and the absorbed dose can be read out at a convenient later time.

Obviously, many modifications and variations of the present invention are possible in light of the above teachings in the specification and drawings. It is therefore to be understood that this invention is to be limited only by the appended claims and may be practiced otherwise than as specifically described herein.

What is claimed is:

1. A fast neutron sensing device comprising:
a proton radiator coated on a doped glass selected from the group consisting of a doped glass that exhibits light stimulatable thermoluminescence, a doped glass that exhibits light stimulatable luminescence and a doped glass that exhibits scintillation.

2. The fast neutron sensing device of claim 1 wherein:
said proton radiator is selected from thermoplastic resin and thermoset resin.

3. The fast neutron sensing device of claim 2 wherein:
said thermoplastic resin is selected from the group consisting of polyethylene, polypropylene and mixtures thereof.

4. The fast neutron sensing device of claim 3 wherein:
said polyethylene is high density polyethylene.

5. The fast neutron sensing device of claim 1 further including:
a second sensing device adjacent to said fast neutron sensing device, said second sensing device comprising a proton nonradiator coated on a second doped glass, or comprising an uncoated second doped glass.

6. The fast neutron sensing device of claim 1 wherein said fast neutron sensing device is a remote fast neutron sensing device, said doped glass exhibiting scintillation, comprising:
an optical fiber;
said fast neutron sensing device being coupled to a first end of said optical fiber for transmitting scintillation light from said fast neutron sensing device; and
means coupled to a second end of said optical fiber for detecting the scintillation light from said fast neutron sensing device.

7. The remote fast neutron sensing device of claim 6 further including:
a lens disposed between said optical fiber and said detecting means for collimating the scintillation light.

8. The remote fast neutron sensing device of claim 6 further including:
a second remote sensing device adjacent to said first remote fast neutron sensing device, said second remote fast sensing device comprising a proton nonradiator coated on a second doped glass or comprising an uncoated second doped glass.

9. The remote fast neutron sensing device of claim 6 wherein:
said means for detecting the scintillation light is selected from the group consisting of a photomultiplier tube, photodiode and photoconductor.

10. The fast neutron sensing device of claim 1, wherein said fast neutron sensing device is a remote fast neutron sensing device, said doped glass in said device exhibiting light stimulable luminescence, comprising:
a light source;
an optical fiber for transmitting light from said light source;
said fast neutron sensing device being coupled to said optical fiber, said optical fiber transmitting light stimulable luminescence from said fast neutron sensing device;
means for separating the luminescence light from the stimulating light; and
means for detecting the luminescence.

11. The remote fast neutron sensing device of claim 10 wherein:
said separating means is a dichroic beam splitter.

12. The remote fast neutron sensing device of claim 10 wherein:
said separating means is a fiberoptic splitter.

13. The remote fast neutron sensing device of claim 10 further including:
a second remote sensing device adjacent to said first remote fast neutron sensing device, said second remote sensing device comprising a proton nonradiator coated on a second doped glass or comprising a second doped glass.

14. The fast neutron sensing device of claim 1 wherein:
said sensing device is a fast neutron dosimeter; and
said proton radiator is selected from thermoplastic resin and thermoset resin.

15. The fast neutron sensing device of claim 14 wherein:
said thermoplastic resin is selected from the group consisting of polyethylene, polypropylene and mixtures thereof.

16. The fast neutron sensing device of claim 15, wherein said polyethylene is high density polyethylene.

17. The sensing device of claim 14, further including:
a second sensing device adjacent to said first fast neutron sensing device, said second sensing device comprising a proton nonradiator coated on a second doped glass, or comprising an uncoated second doped glass.

18. The fast neutron sensing device of claim 17 wherein:
said sensing device is a personal dosimeter which is formed as a badge to be worn on a person.

19. The fast neutron sensing device of claim 14, wherein said fast neutron sensing device is a remote fast neutron sensing device comprising:
an optical fiber;
said fast neutron sensing device being coupled to a first end of said optical fiber for transmitting scintillation light from said fast neutron sensing device; and
means coupled to a second end of said optical fiber for detecting the scintillation light from said fast neutron sensing device.

20. The remote fast neutron sensing device of claim 19 further including:
a lens disposed between said optical fiber and said detecting means for collimating the scintillation light.

21. The remote fast neutron sensing device of claim 19 further including:
a second remote sensing device adjacent to said first remote fast neutron sensing device, said second remote sensing device comprising a proton nonradiator coated on a second doped glass or comprising an uncoated second doped glass.

22. The fast neutron sensing device of claim 14, wherein said fast neutron sensing device is a remote fast neutron sensing device comprising;
a light source;
an optical fiber for transmitting light from said light source;
said fast neutron sensing device being coupled to said optical fiber, said optical fiber transmitting light stimulatable luminescence from said fast neutron sensing device;
means for separating the luminescence light from the stimulating light; and
means for detecting the luminescence.

23. The remote fast neutron sensing device of claim 22 wherein:
said separating means is a dichroic beam splitter.

24. The remote fast neutron sensing device of claim 22 wherein:
said separating means is a fiberoptic splitter.

25. The remote fast neutron sensing device of claim 19 wherein:
said means for detecting the luminescence is selected from the group consisting of a photomultiplier tube, photodiode and photoconductor.

26. The remote fast neutron sensing device of claim 22 further including:
a second remote sensing device adjacent to said first remote fast neutron sensing device, said second remote sensing device comprising a proton nonradiator coated on a second doped glass or comprising a second doped glass.

27. The fast neutron sensing device of claim 1, wherein said doped glass exhibits scintillation, and wherein said fast neutron sensing device is a remote fast neutron sensing device further comprising:

an optical fiber for transmitting scintillation light, having first and second ends; and a detector for detecting the scintillation light from said fast neutron sensing device;

wherein said first end of said optical fiber is coupled to said doped glass and said second end of said optical fiber is coupled to said detector, so as to transmit scintillation light from said doped glass to said detector.

28. The fast neutron sensing device of claim 1, wherein said doped glass exhibits light stimulatable luminescence, and wherein said fast neutron sensing device is a remote fast neutron sensing device further comprising:

a first optical fiber for transmitting stimulation light, having first and second ends;

a stimulation light source;

wherein said first end of said first optical fiber is coupled to said doped glass and said second end of said first optical fiber is coupled to said stimulation light source, so as to transmit stimulation light from said stimulation light source to said doped glass;

a second optical fiber for transmitting luminescence light, having first and second ends; and a detector for detecting the luminescence light from said fast neutron sensing device;

wherein said first end of said second optical fiber is coupled to said doped glass and said second end of said second optical fiber is coupled to said detector, so as to transmit said luminescence light from said doped glass to said detector.

29. The remote fast neutron sensing device of claim 28, further comprising:

a filter interposed between said doped glass and said detector, for preventing transmission of said stimulation light to said detector.

30. A method for the detection of fast neutrons in a radiation field comprising the steps of:

exposing a doped glass coated with a proton radiator to a radiation field of neutrons; and measuring the scintillation light of the doped glass.

31. The method of claim 30 wherein the proton radiator comprises polyethylene.

32. A method for the detection of fast neutrons in a radiation field comprising the steps of:

exposing a doped glass coated with a proton radiator to a radiation field of fast neutrons;

allowing the doped glass to accumulate electrons and holes in traps;

stimulating the doped glass so as to allow the doped glass to luminesce; and measuring the luminescence of the doped glass.

33. The method of claim 32 wherein the proton radiator comprises polyethylene.

34. A method for the differential detection of fast neutrons in a radiation field comprising gamma rays and fast neutrons comprising the steps of:

providing a fast neutron sensing device comprising a doped glass phosphor with a proton radiator adjacent to a doped glass phosphor with either a proton nonradiator or no coating;

exposing the fast neutron sensing device to a radiation field comprising gamma rays and fast neutrons;

measuring the scintillation from the fast neutron sensing device; and determining the difference between the measured scintillation of the doped glass phosphor with the proton radiator and the measured scintillation of the doped glass phosphor with either said proton nonradiator or no coating.

35. The method of claim 34 wherein the proton radiator comprises a thermoplastic.

36. The method of claim 35, wherein the thermoplastic is polyethylene.

37. A method for the differential detection of fast neutrons in a radiation field comprising gamma rays and fast neutrons comprising the steps of:

providing a fast neutron sensing device comprising a doped glass phosphor with a proton radiator adjacent to a doped glass phosphor with either a proton nonradiator or no coating;

exposing the fast neutron sensing device to a radiation field comprising gamma rays and fast neutrons;

allowing the fast neutron sensing device to accumulate trapped electrons and holes;

stimulating the fast neutron sensing device with light to allow luminescence;

measuring the luminescence of the fast neutron sensing device; and determining the difference between the measured scintillation of the doped glass phosphor with the proton radiator and the measured scintillation of the doped glass phosphor with either said proton nonradiator or no coating.

38. The method of claim 37 wherein the proton radiator comprises a thermoplastic.

39. The method of claim 38, wherein the thermoplastic is polyethylene.

40. A method for the remote sensing of fast neutron radiation comprising the steps of:

providing a fast neutron sensing device comprising a doped glass phosphor with a proton radiator attached to an optical fiber;

exposing the fast neutron sensing device to fast neutrons; and measuring the scintillation light transmitted through the optical fiber.

41. A method for the remote sensing of fast neutron radiation comprising the steps of:

providing a fast neutron sensing device comprising a doped glass phosphor with a proton radiator attached to an optical fiber;

exposing the fast neutron sensing device to fast neutrons;

allowing the fast neutron sensing device to accumulate trapped electrons and holes;

stimulating the fast neutron sensing device with light to allow luminescence; and measuring the luminescence of the fast neutron sensing device.

* * * * *